United States Patent
Nakashima et al.

(10) Patent No.: US 8,660,438 B2
(45) Date of Patent: Feb. 25, 2014

(54) DIGITAL COHERENT RECEIVER AND RECEIVING METHOD

(75) Inventors: Hisao Nakashima, Kawasaki (JP); Takeshi Hoshida, Kawasaki (JP); Kosuke Komaki, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 13/083,723

(22) Filed: Apr. 11, 2011

(65) Prior Publication Data

US 2011/0255877 A1 Oct. 20, 2011

(30) Foreign Application Priority Data

Apr. 15, 2010 (JP) ................................. 2010-094436

(51) Int. Cl.
*H04B 10/06* (2011.01)

(52) U.S. Cl.
USPC .............................. 398/208; 398/202; 398/81

(58) Field of Classification Search
None
See application file for complete search history.

(56) References Cited

U.S. PATENT DOCUMENTS

| 2009/0129787 | A1 | 5/2009 | Li et al. | |
| 2009/0142076 | A1* | 6/2009 | Li et al. | 398/208 |
| 2009/0252026 | A1* | 10/2009 | Yousef | 370/210 |
| 2010/0034326 | A1* | 2/2010 | van Driest et al. | 375/343 |

FOREIGN PATENT DOCUMENTS

| JP | 2009-130935 | 6/2009 |
| JP | 2009-135930 | 6/2009 |
| JP | 2010-245780 | 10/2010 |

OTHER PUBLICATIONS

Leven, Andreas et al., "Frequency Estimation in Intradyne Reception", IEEE Photonics Technology Letters, vol. 19, No. 6, Mar. 15, 2007, pp. 366-368.
Ly-Gagnon, Dany-Sebastien et al., "Coherent Detection of Optical Quadrature Phase-Shift Keying Signals With Carrier Phase Estimation", Journal of Lightwave Technology., vol. 24, No. 1, Jan. 2006, pp. 12-21.
Nakashima, Hisao et al., "Novel Wide-range Frequency Offset Compensator Demonstrated with Real-time Digital Coherent Receiver", 34th European Conference and Exhibition on Optical Communication (ECOC 2008) Mo.3. D4, Sep. 21, 2008, pp. 1-2.
Japanese Office Action mailed Dec. 24, 2013 for corresponding Japanese Application 2010-094436, with partial English-language translation.

* cited by examiner

*Primary Examiner* — Ken Vanderpuye
*Assistant Examiner* — David Lambert
(74) *Attorney, Agent, or Firm* — Fujitsu Patent Center

(57) ABSTRACT

A digital coherent receiver includes a front end, an A/D convertor, and a processor. The front end converts a light signal into an electric signal by using a signal light and a local oscillator light. The A/D convertor converts the electric signal of the front end into a digital signal. The processor calculates a spectrum gravity center of the digital signal converted by the A/D convertor, estimates a frequency offset of the digital signal based on the calculated spectrum gravity center, and reduces the frequency offset of the digital signal based on the estimated frequency offset.

10 Claims, 14 Drawing Sheets

DIGITAL COHERENT RECEIVER AND RECEIVING METHOD

CROSS-REFERENCE TO RELATED APPLICATIONS

This application is based upon and claims the benefit of priority of the prior Japanese Patent Application No. 2010-94436, filed on Apr. 15, 2010, the entire contents of which are incorporated herein by reference.

FIELD

Embodiments discussed herein relate to a digital coherent receiver that receives a light and to a method of receiving light.

BACKGROUND

An optical communication system including a trunk line is desired to have a larger capacity because traffic has been increased in the Internet. An optical receiver that may transmit a signal of 100 [Gbit/s] or more per wavelength. If a bit rate per wavelength is increased, deterioration of a signal quality due to Optical Signal Noise Ratio (OSNR), chromatic dispersion, polarization mode dispersion or nonlinear effect in the transmission path is increased.

Therefore, a digital coherent receiving method has been proposed in recent years because of OSNR benefit as well as the potential to compensate for all linear transmission impairment. a direct detecting method which is conventional way for the optical communication system allocates ON/OFF of a light intensity to a binary signal. On the other hand, the digital coherent receiving method extracts the intensity and phase of received light by using the coherent receiving method. The extracted intensity and phase information are quantized by an Analog/Digital (A/D) convertor and are demodulated by a digital signal processor.

There is an advantage of which the digital coherent receiver can synchronize a frequency and a phase between a transmission light source and a local oscillator light source by using digital signal processing. Accordingly, optical Phase Locked Loop (PLL), which is difficult to be realized, is not needed.

Typically available tunable laser have end of life frequency accuracy of several [GHz]. A frequency difference (frequency offset) between a light source of a transmitter and a Local Oscillator (LO) of a receiver may occur within a range of frequency accuracy.

For example, reception of a Quadrature Phase Shift Keying (QPSK) signal will be described. If the frequency offset is small enough, only static rotation caused by a phase shift is observed in the signal constellation observed for a short time. On the other hand, if the frequency offset is large, a constellation is rotated by the frequency offset during an observation time by the frequency offset. As a result, identification of a QPSK signal becomes difficult. Therefore, compensation of the frequency offset is used. Hereinafter, as well as the frequency difference between the transmission optical source and the LO optical source, a phase rotation caused by a frequency offset will be referred to as a frequency offset.

To compensate for the frequency offset, for example, the frequency offset may be estimated by the frequency offset estimation circuit in digital signal processing, and the constellation is inverse rotated in a digital circuit by the estimated frequency offset. For example, m-th power method is well known technique for frequency offset estimation, which removes a coding component by raising the MPSK signal of an m value to the m-th power and extracts the component of the frequency offset (see, for example, Non-Patent Document 1). Furthermore, there is a known technique for expanding an estimation range of the frequency offset estimator by using performing temporary determination of a signal to remove the coding component (see, for example, Non-Patent Document 2).

[Non-Patent Document 1] A. Leven et al. "Frequency Estimation in Intradyne Reception", IEEE Photonics Technology Letters, Vol. 19, No. 6, p. 366-368, March, 2007

[Non-Patent Document 2] H. Nakashima et al. "Novel Wide-range Frequency Offset Compensator Demonstrated with Real-time Digital Coherent Receiver", 34th European Conference and Exhibition on Optical Communication (ECOC2008), Mo.3.D.4, p. 1-2, September, 2008

In the above-described prior art, however, there is limitation of a pull-in range in an estimation circuit of the frequency offset, so that the frequency offset outside the pull-in range may not be accurately estimated. As a result, the large frequency offset may not be accurately compensated, and the reception quality is deteriorated. To solve the above-described problem, differential decoding may be used. However, this may cause a problem that the OSNR property is deteriorated.

The disclosed digital coherent receiver and receiving method are used to solve the above-described problems and improve the reception quality.

SUMMARY

According to an aspect of the invention, a digital coherent receiver includes a front end, an A/D convertor, and a processor. The front end converts a light signal into an electric signal by using a signal light and a local oscillator light. The A/D convertor converts the electric signal of the front end into a digital signal. The processor calculates a spectrum gravity center of the digital signal converted by the A/D convertor, estimates a frequency offset of the digital signal based on the calculated spectrum gravity center, and reduces the frequency offset of the digital signal based on the estimated frequency offset.

The object and advantages of the invention will be realized and attained via the elements and combinations particularly pointed out in the claims. It is to be understood that both the foregoing general description and the following detailed description are exemplary and explanatory and are not restrictive of the invention, as claimed.

DESCRIPTION OF EMBODIMENTS

With reference to the attached diagrams, embodiments of the disclosed techniques will be described in detail below. According to the disclosed technique, the digital coherent receiver accurately compensates a frequency offset between a signal light and a local oscillator light to improve the reception quality by using a spectrum gravity center of a digital-converted signal.

First Embodiment

Figure 1:
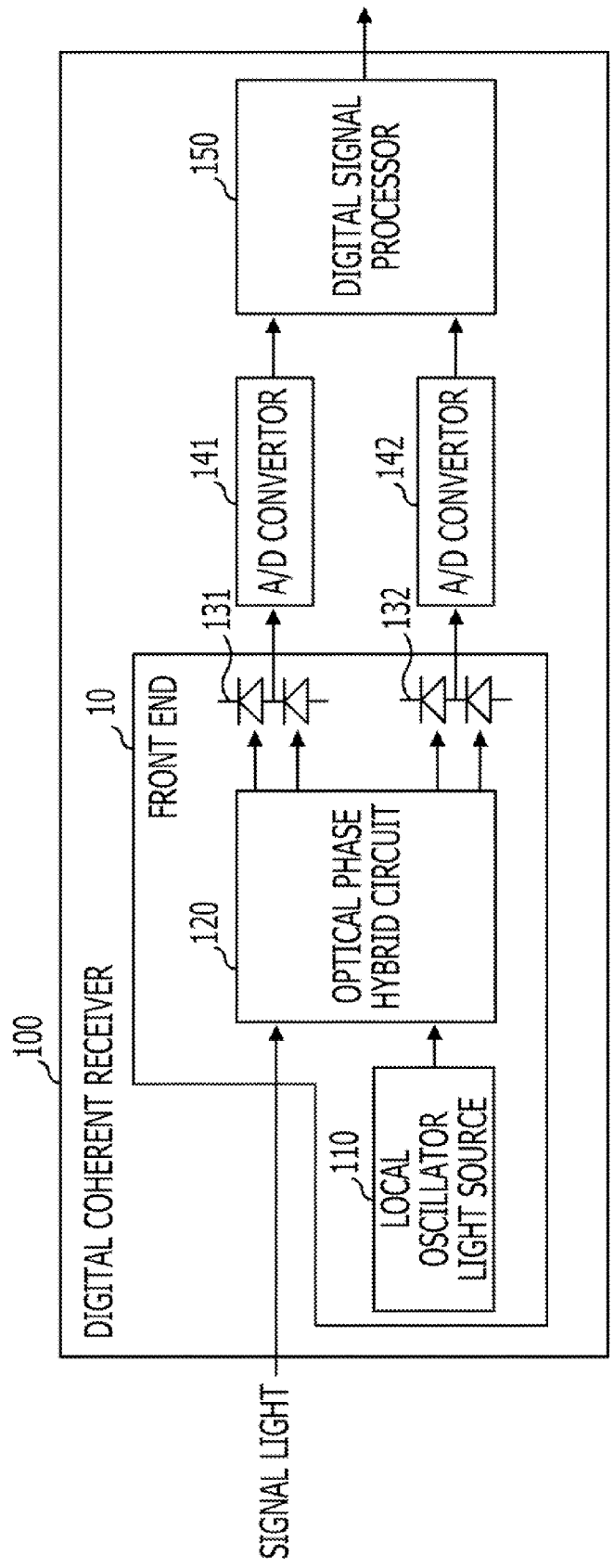
FIG. 1 is a configuration example of a digital coherent receiver according to a first embodiment.

FIG. 1 is a diagram illustrating a configuration example of a digital coherent receiver according to a first embodiment. As illustrated in FIG. 1, a digital coherent receiver 100 according to the first embodiment includes a local oscillator light source 110, an optical phase hybrid circuit 120, photoelectric conversion elements 131 and 132, Analog/Digital (A/D) convertors 141 and 142, and a digital signal processor 150. The digital coherent receiver 100 receives, for example, the signal light of Quadrature Phase Shift Keying (QPSK).

A front end 10 includes the optical phase hybrid circuit 120 and the photoelectric conversion elements 131 and 132 and performs photoelectric conversion by mixing the signal light and the local oscillator light received by the digital coherent receiver 100. Specifically, the local oscillator light source 110 generates a local oscillator light and outputs the generated local oscillator light to the optical phase hybrid circuit 120. The local oscillator light source 110 is, for example, an Integrable Tunable Laser Assembly (ITLA).

The optical phase hybrid circuit 120 extracts a complex electric field indicating an optical intensity and a phase of an optical signal by mixing the signal light and the local oscillator light output from the local oscillator light source 110. The optical phase hybrid circuit 120 outputs, to the photoelectric conversion element 131, a light (an I signal) with a strength according to a real part of the extracted complex electric field. The optical phase hybrid circuit 120 outputs a light (a Q signal) with a strength according to an imaginary part of the extracted complex electric field. For example, FIG. 2 will illustrate the configuration of the optical phase hybrid circuit 120.

The photoelectric conversion element 131 photoelectric-converts the I signal output from the optical phase hybrid circuit 120 and then outputs the photoelectric-converted I signal to the A/D convertor 141. The photoelectric conversion element 132 photoelectric-converts the Q signal output from the optical phase hybrid circuit 120 and then outputs the photoelectric-converted Q signal to the A/D convertor 142. Each of the photoelectric conversion element 131 and the photoelectric conversion element 132 is, for example, a Photo Diode (PD).

The A/D convertors 141 and 142 convert an output of the front end 10 into a digital signal. Specifically, the A/D convertor 141 converts the I signal output from the photoelectric conversion element 131 into a digital signal by sampling the I signal with a sampling frequency. The A/D convertor 142 converts the Q signal output from the photoelectric conversion element 132 into a digital signal by sampling the Q signal with a sampling frequency. The A/D convertors 141 and 142 output the converted digital signal to the digital signal processor 150, respectively.

The digital signal processor 150 identifies the signal light by performing digital processing on the I signal and the Q signal output from the A/D convertors 141 and 142, respectively. The digital signal processor 150 outputs an identification result of the signal light. A configuration of the digital signal processor 150 is described in FIG. 3, for example. The digital signal processor 150, which is a processor such as a DSP, may include a logical circuit. Furthermore, the digital signal processor 150 may include a Field-Programmable Gate Array (FPGA) and the like.

Figure 2:
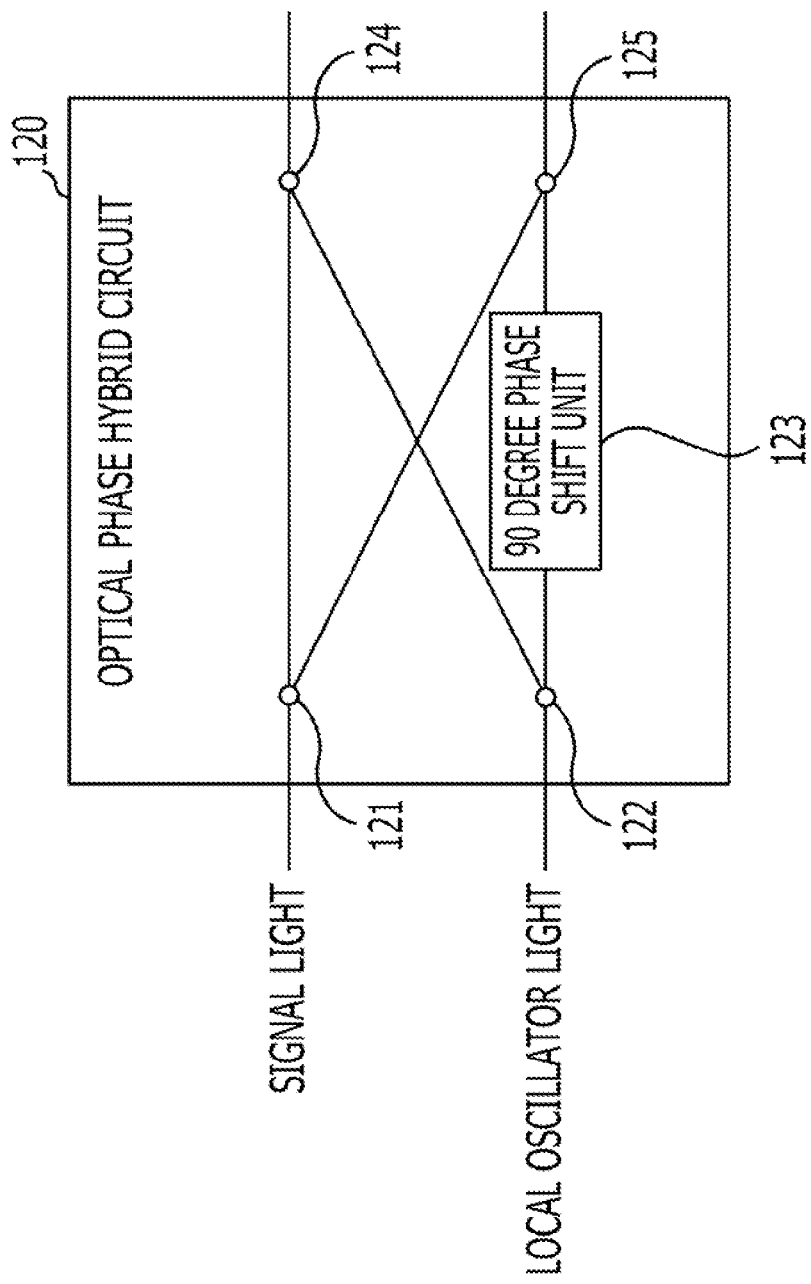
FIG. 2 is a conceptual diagram of an optical phase hybrid circuit according to the first embodiment.

FIG. 2 is a conceptual diagram of an optical phase hybrid circuit according to the first embodiment. As illustrated in FIG. 2, the optical phase hybrid circuit 120 includes branching units 121 and 122, a 90 degree phase shift unit 123, and interference units 124 and 125. An optical signal is input into the branching unit 121. The branching unit 121 branches the input signal light and then outputs the branched signal lights to the interference unit 124 and the interference unit 125, respectively.

A local oscillator light is input from the local oscillator light source 110 into the branching unit 122. The branching unit 122 branches the input local oscillator light and then outputs the branched local oscillator lights to the interference unit 124 and the 90 degree phase shift unit 123, respectively. The 90 degree phase shift unit 123 shifts, by 90 degrees, the phase of the local oscillator light output from the branching unit 122. The 90 degree phase shift unit 123 outputs, to the interference unit 125, the local oscillator light whose phase is shifted.

The interference unit 124 interferes the signal light output from the branching unit 121 with the local oscillator light output from the branching unit 122. The interference unit 124 outputs the interfered light as an I signal to the photoelectric conversion element 131. The interference unit 125 interferes the signal light output from the branching unit 121 with the local oscillator light output from the 90 degree phase shift unit 123. The interference unit 125 outputs the interfered light as a Q signal to the photoelectric conversion element 132.

Figure 3:
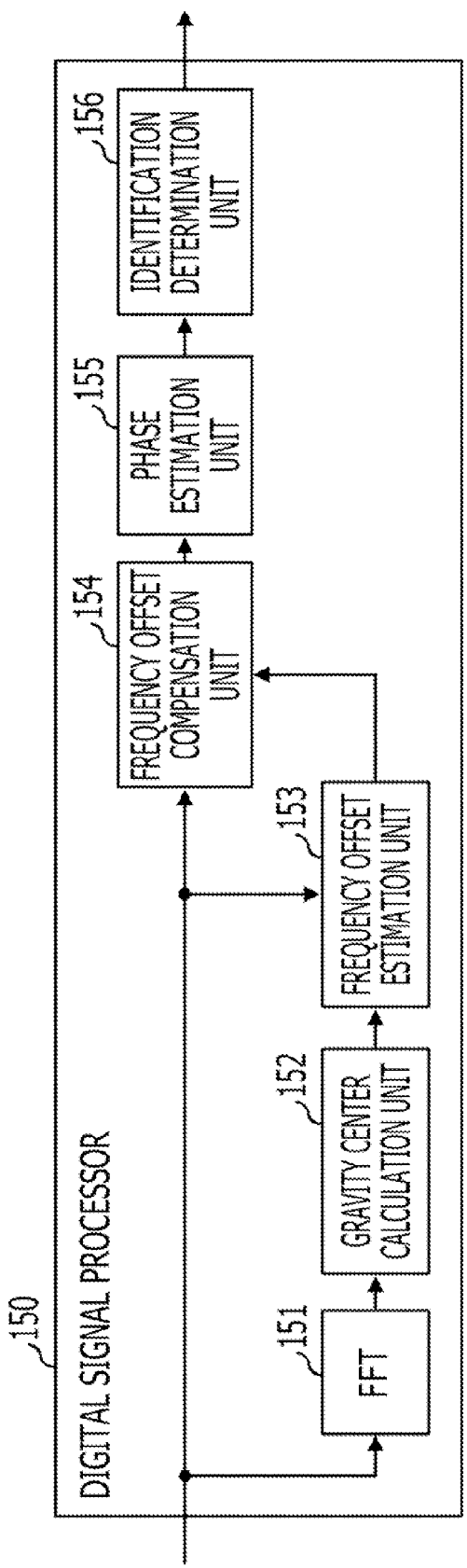
FIG. 3 is a configuration example of a digital signal processor according to the first embodiment.

FIG. 3 is a diagram illustrating a configuration example of a digital signal processor according to the first embodiment. As illustrated in FIG. 3, the digital signal processor 150 includes a Fourier transformation unit 151, a gravity center calculation unit 152, a frequency offset estimation unit 153, a frequency offset compensation unit 154, a phase estimation unit 155, and an identification determination unit 156. The signal of a complex number with the I signal as a real part output from the A/D convertor 141 and the Q signal as an imaginary part output from the A/D convertor 142 is input into the digital signal processor 150.

The Fourier transformation unit 151 and the gravity center calculation unit 152 are calculation units that calculate a spectrum gravity center of the signal converted by the A/D convertors 141 and 142. Specifically, the Fourier transformation unit 151 performs Fast Fourier Transform (FFT) on the signal that is input into the digital signal processor 150. The Fourier transformation unit 151 outputs the spectrum obtained by the FFT to the gravity center calculation unit 152.

The gravity center calculation unit 152 calculates a spectrum gravity center as the gravity center of the spectrum output from the Fourier transformation unit 151. The spectrum gravity center is, for example, a frequency in the center of a frequency range in which signals are distributed in the spectrum. The gravity center calculation unit 152 calculates the spectrum gravity center by the formula (I) described below, for example.

$$\text{spectrum gravity center} = \frac{\sum_{i=-\frac{N}{2}-1}^{\frac{N}{2}} i * P(i)}{\sum_{i=-\frac{N}{2}-1}^{\frac{N}{2}} P(i)} * \Delta * \frac{1}{fb} \quad (1)$$

In the above-described formula (I), i is an index indicating a frequency of the spectrum. In this case, P (i) is a power of the spectrum according to the frequency indicated by the index i. Also, N is an FFT size of Fourier transformation performed by the Fourier transformer unit 151. Moreover, Δ is fs/(N−1). Furthermore, fs is a sampling frequency in the A/D convertors 141 and 142. Moreover, fb is a baud rate of the signal light received by the digital coherent receiver 100. The gravity center calculation unit 152 outputs the calculated spectrum gravity center to the frequency offset estimation unit 153.

Based on the spectrum gravity center output from the gravity center calculation unit 152, the frequency offset estimation unit 153 estimates a frequency offset of the signal that is input into the digital signal processor 150. The frequency offset estimation 153 outputs a frequency offset estimate value indicating an estimation result of the frequency offset to the frequency offset compensation unit 154. For example, FIG. 5 will illustrate a configuration of the frequency offset estimation unit 153.

Based on the frequency offset estimate value output from the frequency offset estimation unit 153, the frequency offset compensation unit 154 (an adjusting unit) compensates the signal input into the digital signal processor 150. For example, the frequency offset compensation unit 154 compensates the frequency offset of the signal by giving an inverse property of the frequency offset estimate value output from the frequency offset estimation unit 153. The compensation of the frequency offset by the frequency offset compensation unit 154 is not limited to a case of reducing the frequency offset to 0. The frequency offset is desired to be reduced by the compensation. The frequency offset compensation unit 154 outputs the signal whose frequency offset is compensated to the phase estimation unit 155.

With respect to the signal output from the frequency offset compensation unit 154, the phase estimation unit 155 estimates and compensates a phase difference between the signal light received by the digital coherent receiver 100 and the local oscillator light output from the local oscillator light source 110. The phase estimation unit 155 outputs the signal whose phase difference is compensated to the identification determination unit 156. The identification determination unit 156 identifies the signal output from the phase estimation unit 155. The identification determination unit 156 outputs the identification result.

Figure 4:
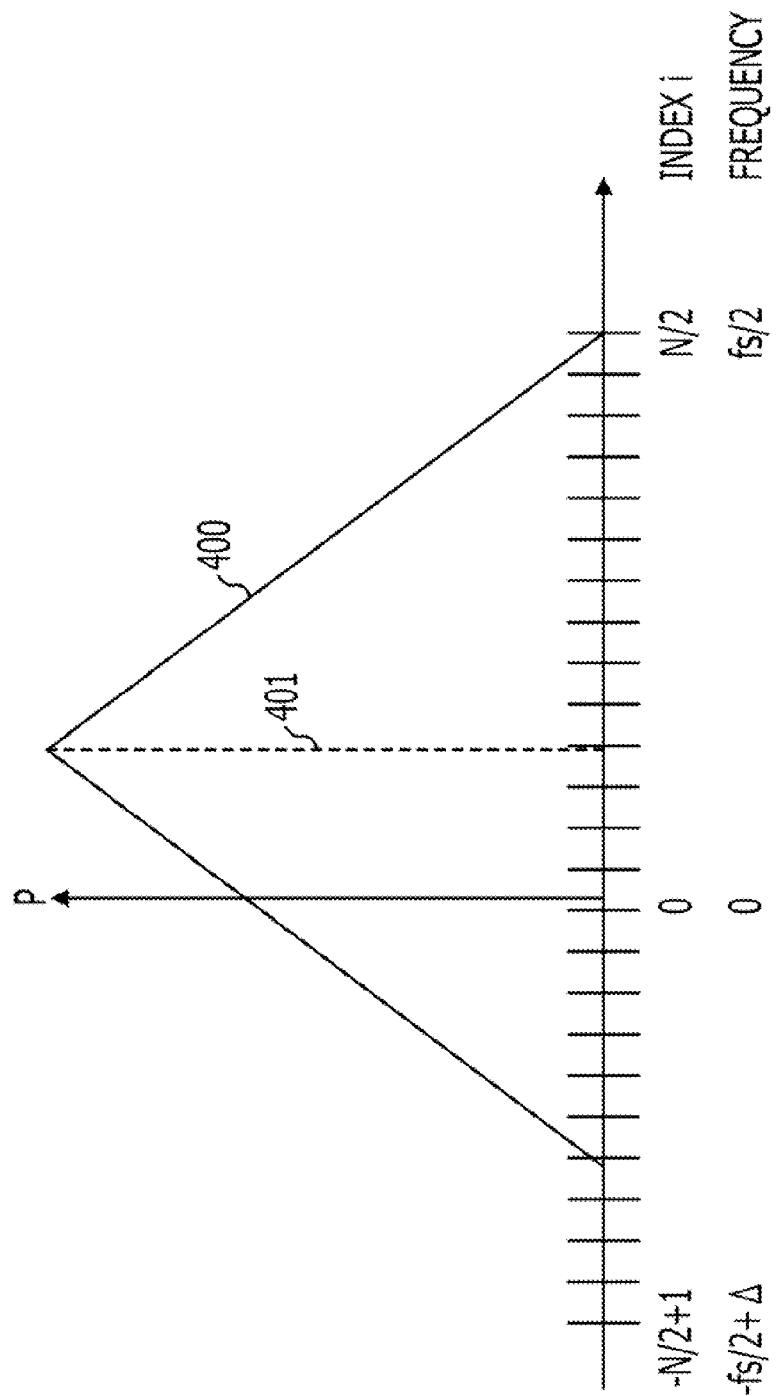
FIG. 4 is an example of a spectrum of a signal.

FIG. 4 is a diagram illustrating an example of a spectrum of a signal. The transverse axis in FIG. 4 indicates the frequency and the index i. The index i corresponds to a frequency. Specifically, −N/2+1 and N/2 as the index i correspond to −fs/2+Δ and fs/2 as the frequency, respectively. The longitudinal axis in the FIG. 4 indicates the power P of the frequency component. A spectrum 400 is output from the Fourier transformation unit 151.

A spectrum gravity center 401 is calculated by the gravity center calculation unit 152. The spectrum gravity center 401 is shifted from 0 according to the size of the frequency offset. Therefore, the frequency offset estimation unit 153 may effectively estimate the frequency offset by estimating the frequency offset based on the spectrum gravity center 401.

Figure 5:
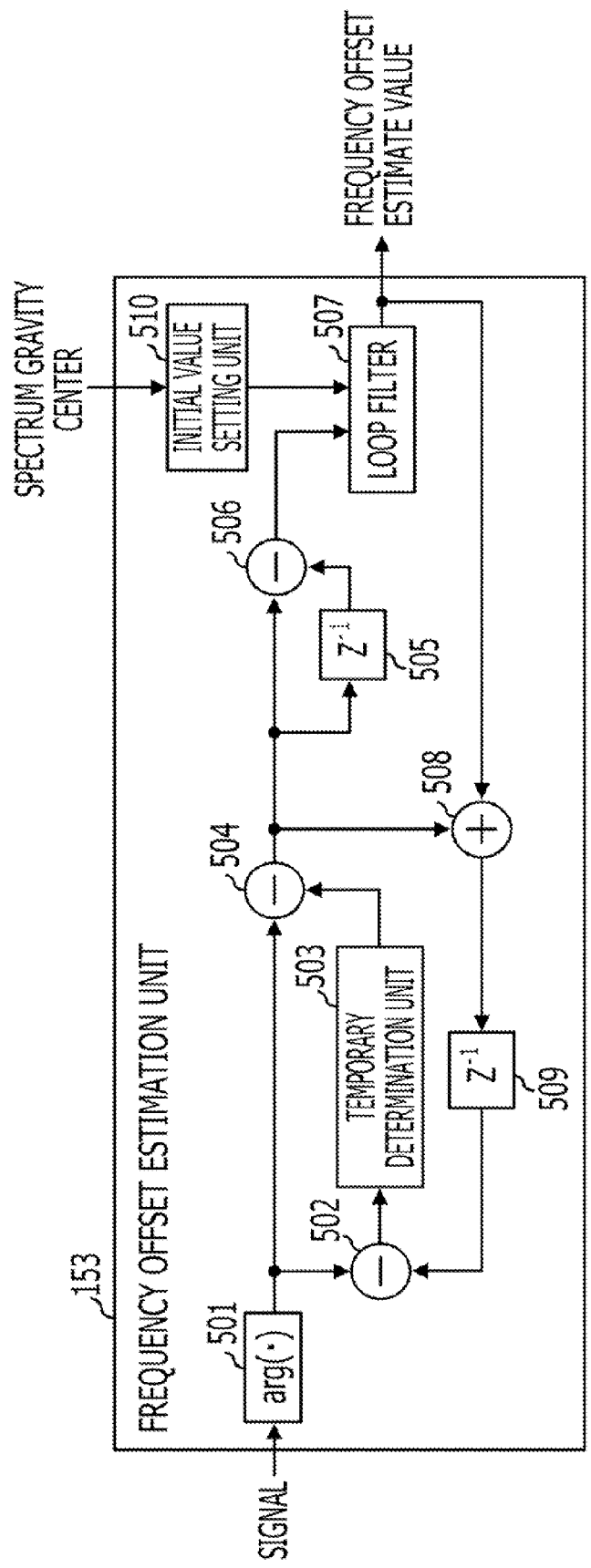
FIG. 5 is a configuration example of a frequency offset estimation unit according to the first embodiment.

FIG. 5 is a diagram illustrating a configuration example of a frequency offset estimating unit according to the first embodiment. As illustrated in FIG. 5, the frequency offset estimation unit 153 includes a deflection angle calculation unit 501, a subtraction unit 502, a temporary determination unit 503, a subtraction unit 504, a delay unit 505, a subtraction unit 506, a loop filter 507, an addition unit 508, a delay unit 509, and an initial value setting unit 510.

The offset estimation unit 153 illustrated in FIG. 5 recursively estimates the frequency offset of the input signal. That is, the frequency offset estimation unit 153 estimates the frequency offset while feeding back the calculation result (the output from the loop filter 507) of the frequency offset.

The signal input into the frequency offset estimation unit 153 is input into the deflection angle calculation unit 501. The deflection angle calculation unit 501 calculates a phase angle indicated by the input signal of the complex number. The deflection angle calculation unit 501 outputs the signal that indicates the calculated phase angle to the subtraction unit 502 and the subtraction unit 504. The subtraction unit 502 subtracts the signal, which is output from the delay unit 509, from the signal output from the deflection angle calculation unit 501. The subtraction unit 502 outputs the subtraction result to the temporary determination unit 503.

The temporary determination unit 503 temporarily-determines (identifies) the signal based on the subtraction result output from the subtraction unit 502. The temporary determination unit 503 outputs the signal indicating the temporary determination result to the subtraction unit 504. The subtraction unit 504 subtracts the signal, which is output from the temporary determination unit 503, from the signal output from the deflection angle calculation unit 501. The subtraction unit 504 outputs the signal indicating the subtraction result to the delay unit 505, the subtraction unit 506, and the addition unit 508.

The delay unit 505 delays the signal output from the subtraction unit 504 by one symbol. The delay unit 505 outputs the delayed signal to the subtraction unit 506. The subtraction unit 506 subtracts the signal, which is output from the subtraction unit 504, from the signal output from the delay unit 505. The subtraction unit 506 outputs the signal indicating the subtraction result to the loop filter 507.

The loop filter 507 averages the signal output from the subtraction unit 506. The loop filter 507 is, for example, an Infinite Impulse Response (IIR) filter that has an infinite impulse response. The loop filter 507 outputs the averaged signal as a frequency offset estimate value. Furthermore, the loop filter 507 outputs the averaged signal to the addition unit 508.

The addition unit 508 adds the signal output from the subtraction unit 504 to the signal output from the loop filter 507. The addition unit 508 outputs the signal that indicates the addition result to the delay unit 509. The delay unit 509 delays the signal output from the addition unit 508 by one symbol. The delay unit 509 outputs the delayed signal to the subtraction unit 502.

The initial value setting unit 510 sets the spectrum gravity center, which is output from the gravity center calculation unit 152, as an initial value of the signal output from the loop filter 507. In this manner, the frequency offset estimation unit 153 recursively estimates the frequency offset of the input signal when the spectrum gravity center calculated by the gravity center calculation unit 152 is set as the initial value.

The signal of the time t+1 output from the deflection angle calculation unit 501 indicates the phase angle θ(t+1). The phase angle θ(t+1) may be indicated by θd(t+1)+θfo(t+1)+θPN(t+1). In this case, θd(t+1) indicates a demodulation component. Moreover, θfo(t+1) indicates a phase rotation amount caused by the frequency offset. Furthermore, θPN(t+1) indicates a phase noise.

The signal output from the temporary determination unit 503 indicates a temporary determination result of the modulation component, so that the signal becomes approximately θd(t+1). Therefore, the signal output from the subtraction unit 504 may be indicated by θfo(t+1)+θPN(t+1), and the signal output from the delay unit 505 may be indicated by θfo(t)+θPN(t).

Accordingly, the signal output from the subtraction unit 506 may be indicated by θfo(t+1)−θfo(t)+θPN(t+1)−θPN(t). On the based on the assumption of θPN(t+1)=θPN(t), the signal output from the subtraction unit 506 may be indicated by Δfo=θfo(t+1)−θfo(t). In this case, Δfo is a variation amount of the phase rotation amount between the symbols and indicates a frequency offset. The loop filter 507 may obtain a frequency offset estimate value by averaging the frequency offset Δfo.

The signal output from the addition unit 508 is indicated by θfo(t+1)+θPN(t+1)+Δfo. Therefore, the signal output from the delay unit 509 is indicated by θfo(t)+θPN(t)+Δfo. In this case, θfo(t)=θfo(t+1)−Δfo is obtained. Moreover, θPN(t)=θPN(t+1) is assumed. Therefore, the signal output from the delay unit 509 is indicated by θfo(t+1)+θPN(t+1). Accordingly, the signal output from the subtraction unit 502 is indicated by θd(t+1), a demodulation component.

Figure 6:
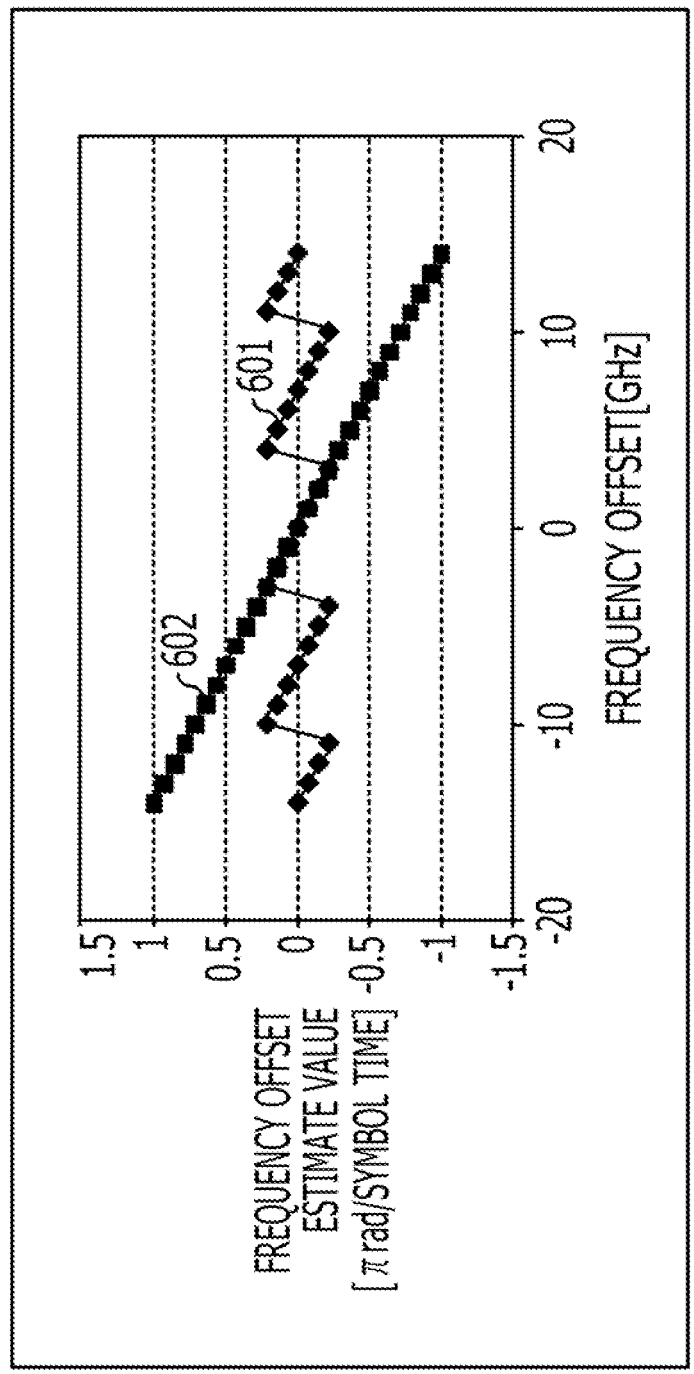
FIG. 6 illustrates a relation between a frequency offset and a frequency offset estimate value.

FIG. 6 is a graph illustrating a relation between a frequency offset and a frequency offset estimate value. In FIG. 6, the transverse axis indicates the actual frequency offset [GHz]. The longitudinal axis indicates a frequency offset estimate value output from the frequency offset estimation unit 153. A relation 601 indicates, for example, a relation between the actual frequency offset and the frequency offset estimate value if the initial value of an output of the loop filter 507 is assumed to be a fixed value (for example, zero).

If the initial value of the loop filter 507 is a fixed value (0 GHz in FIG. 6), phase variation caused by the frequency offset is wrongly recognized as a value variation caused by the phase modulation. Therefore, the frequency offset estimate value output from the frequency offset estimation unit 153 periodically varies according to the actual frequency offset. As a result, the actual frequency offset may not be accurately estimated.

A relation 602 indicates a property of the frequency offset estimate value according to the actual frequency offset if the spectrum gravity center is set as the initial value of the output of the loop filter 507. If the spectrum gravity center is set as the initial value of the output of the loop filter 507, the initial value may remain within the pull-in range. This makes it possible to obtain the actual frequency offset by the frequency offset estimate value output from the frequency offset estimation unit 153.

The digital coherent receiver 100 according to the first embodiment may estimate the frequency offset by using the spectrum gravity center of the signal. Specifically, if the spectrum gravity center of the signal is set as the initial value by the frequency offset estimation unit 153 that recursively estimates the frequency offset, the frequency offset may be accurately estimated regardless of the frequency offset during reception of the signal light (see, for example, the relation 602 in FIG. 6).

Therefore, the frequency offset may be accurately compensated for to improve the reception quality. The pull-in range of the frequency offset may be expanded. For example, the pull-in range of the frequency offset may be expanded without using the differential decoding. As a result, the reception quality may be improved while the deterioration of the OSNR property is reduced if not prevented.

If the spectrum gravity center of the signal is set as the initial value in the frequency offset estimation unit 153 that recursively estimates the frequency offset, estimation results of the frequency offset may be converged in a short time. As a result, the starting time of the digital coherent receiver 100 may be shortened.

Second Embodiment

For the digital coherent receiver 100 according to a second embodiment, descriptions of the parts similar to the parts of the digital coherent receiver 100 according to the first embodiment are omitted.

Figure 7:
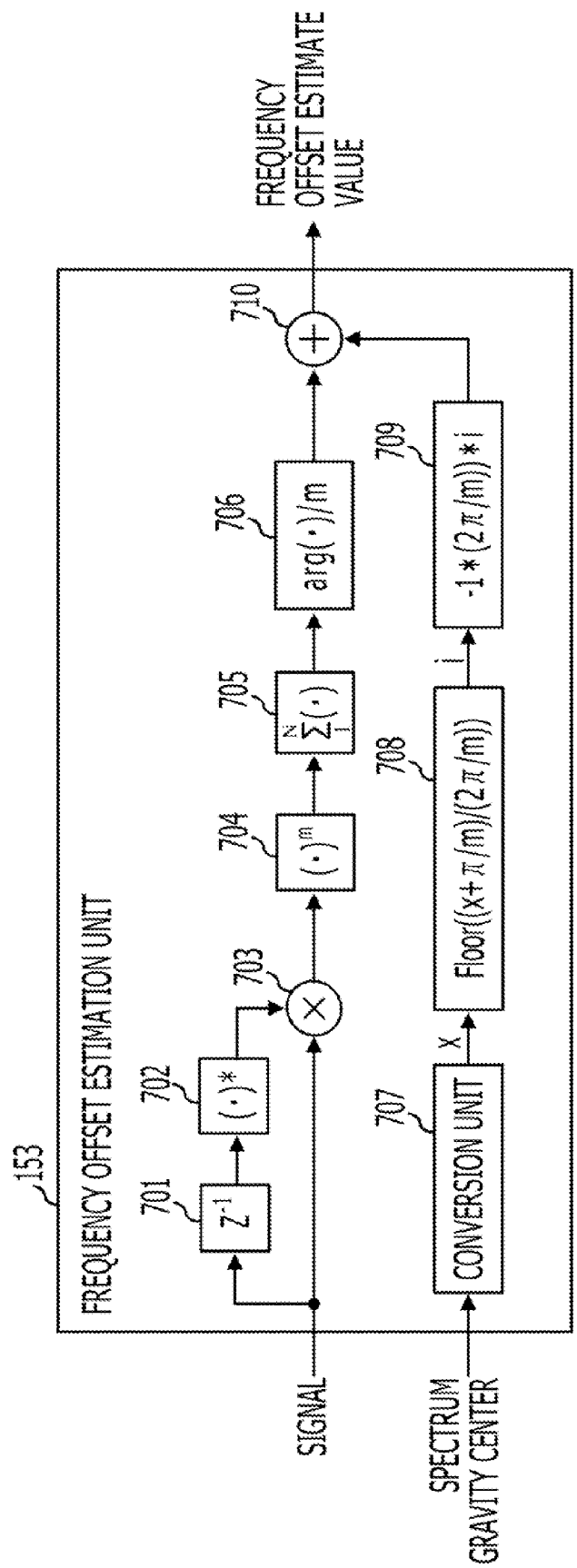
FIG. 7 illustrates a configuration example of a frequency offset estimation unit according to a second embodiment.

FIG. 7 is a diagram illustrating a configuration example of a frequency offset estimating unit according to the second embodiment. As illustrated in FIG. 7, the frequency offset estimation unit 153 of the digital coherent receiver 100 according to the second embodiment includes a delay unit 701, a complex conjugate calculation unit 702, a multiplication unit 703, an exponentiation unit 704, an average unit 705, a deflection angle calculation unit 706, a conversion unit 707, a quotient calculation unit 708, a calculation unit 709, and an addition unit 710. The frequency offset estimation unit 153 illustrated in FIG. 7 estimates the frequency offset by correcting the frequency offset, which is calculated based on the input signal, based on the spectrum gravity center calculated by the gravity center calculation unit 152.

The signal (the complex number), which is input into the frequency offset estimation unit 153, is input into the delay unit 701 and the multiplication unit 703. The delay unit 701 delays the input signal by one symbol and then outputs the delayed signal to the complex conjugate calculation unit 702. The complex conjugate calculation unit 702 calculates a complex conjugate of the signal output from the delay unit 701 and then outputs the calculated complex conjugate to the multiplication unit 703.

The multiplication unit 703 multiplies the signal, which is input into the frequency offset estimation unit 153, by the complex conjugate, which is output from the complex conjugate calculation unit 702. The multiplication result from the multiplication unit 703 indicates a phase difference (a phase rotation amount) between the symbols of the signal input into the frequency offset estimation unit 153. The phase rotation amount indicated by the multiplication result from the multiplication unit 703 includes the phase rotation amount by the modulation component of the signal and the phase rotation amount by the frequency offset. The multiplication unit 703 outputs the signal that indicates the multiplication result to the exponentiation unit 704.

The exponentiation unit 704 raises the signal output from the multiplication unit 703 to the m-th power. In this case, m is a number of a value indicated by one symbol of the signal. For example, if the signal is modulated by performing QPSK modulation, the exponentiation unit 704 raises the signal to the fourth power. Accordingly, the phase rotation amount by the modulation component of the signal may be removed from the phase rotation amount indicated by the signal output from the multiplication unit 703. The signal that is raised to the m-th power by the exponentiation unit 704 indicates the phase rotation amount (m times larger than the actual phase rotation amount) by the frequency offset. The exponentiation unit 704 outputs the signal, which is raised to the m-th power, to the average unit 705.

The average unit 705 adds an N sample to the signal output from the exponentiation unit 704. This makes it possible to remove noise of the signal output from the exponentiation unit 704. The average unit 705 outputs the signal that indicates the addition result to the deflection angle calculation unit 706. The deflection angle calculation unit 706 calculates a deflection angle of the signal of a complex number output from the average unit 705 and then divides the calculated angle by m. Accordingly, the frequency offset may be obtained. The deflection angle calculation unit 706 outputs the calculated frequency offset as a frequency offset estimate value to the addition unit 710.

The spectrum gravity center output from the gravity center calculation unit 152 is input into the conversion unit 707. The conversion unit 707 converts the input spectrum gravity center into a phase rotation amount of one symbol time. The conversion unit 707 outputs a converted phase rotation amount x to the quotient calculation unit 708. The quotient calculation unit 708 calculates an integer portion of a quotient obtained by dividing the value, which is obtained by adding the phase rotation amount x output from the conversion unit 707 to $\pi/m$, by $2\pi/m$ (FLOOR$((x+\pi/m)/(2\pi/m))$). The quotient calculation unit 708 outputs a signal i that indicates the calculation result to the calculation unit 709.

The calculation unit 709 calculates $-1*(2\pi/m)*i$ based on the signal i output from the quotient calculation unit 708. The calculation unit 709 outputs the calculation result as a corrected value of the frequency offset estimate value to the addition unit 710. The addition unit 710 adds the frequency offset estimate value output from the deflection angle calculation unit 706 to the corrected value output from the deflection angle calculation unit 706. The addition unit 710 outputs the frequency offset estimate value that is added to the corrected value.

Therefore, the frequency offset estimation unit 153 may correct the frequency offset estimate value estimated based on the frequency offset estimated by the spectrum gravity center in a Phase Shift Keying (PSK) system of the m value. Accordingly, the actual frequency offset becomes larger than the estimated range. Even if the frequency offset estimate value periodically varies according to the actual frequency offset (see, for example, the relation 601 in FIG. 6), the frequency offset may be accurately estimated.

Figure 8:
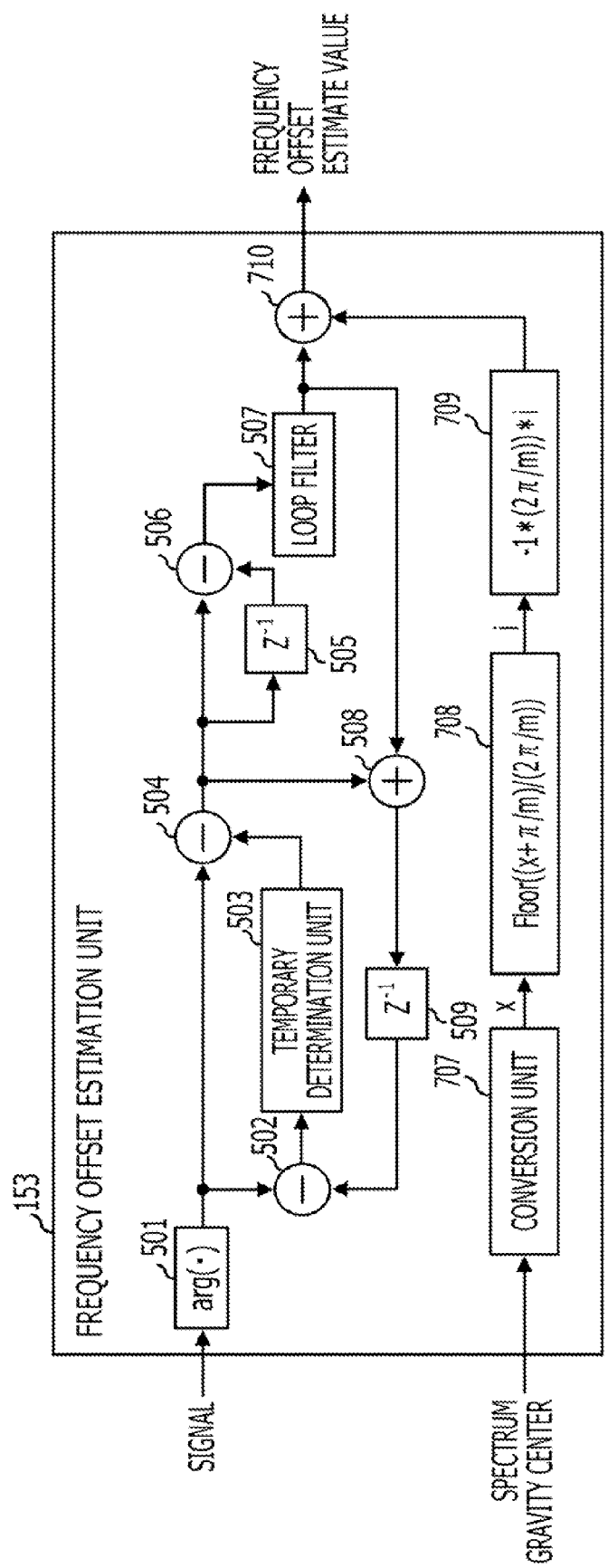
FIG. 8 illustrates a deformation example of the frequency offset estimation according to the second embodiment.

FIG. 8 is a diagram illustrating a deformation example of a frequency offset estimating unit according to the second embodiment. In FIG. 8, the parts similar to the parts of the configuration illustrated in FIG. 5 and FIG. 7 are indicated with the same numerals, and the descriptions are omitted. As illustrated in FIG. 8, the frequency offset estimation unit 153 may include the conversion unit 707, the quotient calculation unit 708, the calculation unit 709, and the addition unit 710 in addition to the frequency offset estimation unit 153. In this case, the initial value setting unit 510 illustrated in FIG. 5 may be omitted.

The loop filter 507 outputs the frequency offset estimate value to the addition unit 710. The addition unit 710 adds the frequency offset estimate value output from the loop filter 507 to the corrected value output from the calculation unit 709. Accordingly, the frequency offset estimation unit 153 may correct the frequency offset estimate value that is estimated based on the frequency offset estimated by the spectrum gravity center in the PSK system of the m value.

As described above, the digital coherent receiver 100 according to the second embodiment may estimate the frequency offset by using the spectrum gravity center of the signal. Specifically, based on the spectrum gravity center of the signal, the frequency offset may be accurately estimated by correcting the frequency offset, which is calculated based on the input signal regardless of the frequency offset during the reception of the signal light.

As a result, the frequency offset may be accurately compensated to improve the reception quality. The pull-in range of the frequency offset may be expanded. For example, the pull-in range may be expanded without using the differential decoding. As a result, the reception quality may be improved while the deterioration of the OSNR property is reduced if not prevented.

Third Embodiment

For the digital coherent receiver 100 according to a third embodiment, descriptions of the parts similar to the parts of the digital coherent receiver 100 according to the first embodiment are omitted.

Figure 9:
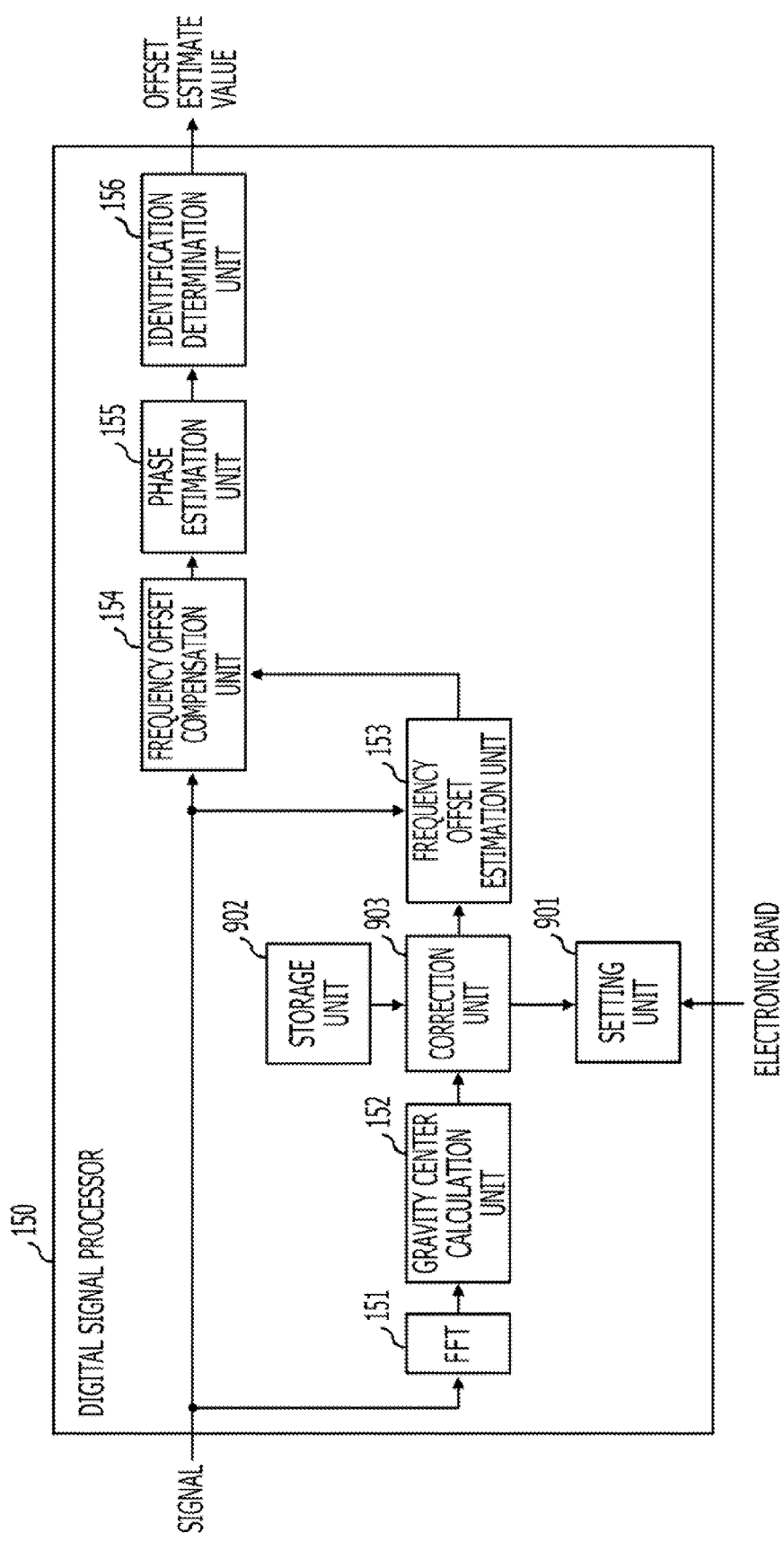
FIG. 9 illustrates a configuration example of a digital signal processor according to a third embodiment.

FIG. 9 is a diagram illustrating a configuration example of a digital signal processor according to the third embodiment. In FIG. 9, the parts similar to the parts of the configuration illustrated in FIG. 3 are indicated with the same numerals, and the descriptions are omitted. As illustrated in FIG. 9, the digital signal processor 150 according to the third embodiment includes a setting unit 901, a storage unit 902, and a correction unit 903 in addition to the configuration illustrated in FIG. 3.

The gravity center calculation unit 152 outputs the calculated spectrum gravity center to the correction unit 903. For example, the frequency offset estimation unit 153 illustrated in FIG. 5, FIG. 7, or FIG. 8 may be used as the frequency offset estimation unit 153.

The setting unit 901 sets an electronic band of the digital coherent receiver 100 by operation of a user, for example. The electronic band of the digital coherent receiver 100 is an electronic band in an output from the front end 10. The electronic band of the digital coherent receiver 100 is, for example, an electronic band between the photoelectric conversion elements 131 and 132, and the A/D convertors 141 and 142, respectively. The setting unit 901 outputs the set electronic band to the correction unit 903.

The storage unit 902 stores correction information of the spectrum gravity center of each of the electronic bands of the digital coherent receiver 100. The correction information is, for example, correspondence information that makes an uncorrected spectrum gravity center correspond to a corrected spectrum gravity center. Alternatively, the correction information may be a formula for calculating the corrected spectrum gravity center from the uncorrected spectrum gravity center.

The correction unit 903 reads, from the storage unit 902, the correction information corresponding to the electronic band output from the setting unit 901. The correction unit 903 corrects the spectrum gravity center, which is output from the gravity center calculation unit 152, based on the read correction information. The correction unit 903 outputs the corrected spectrum gravity center to the frequency offset estimation unit 153.

Figure 10:
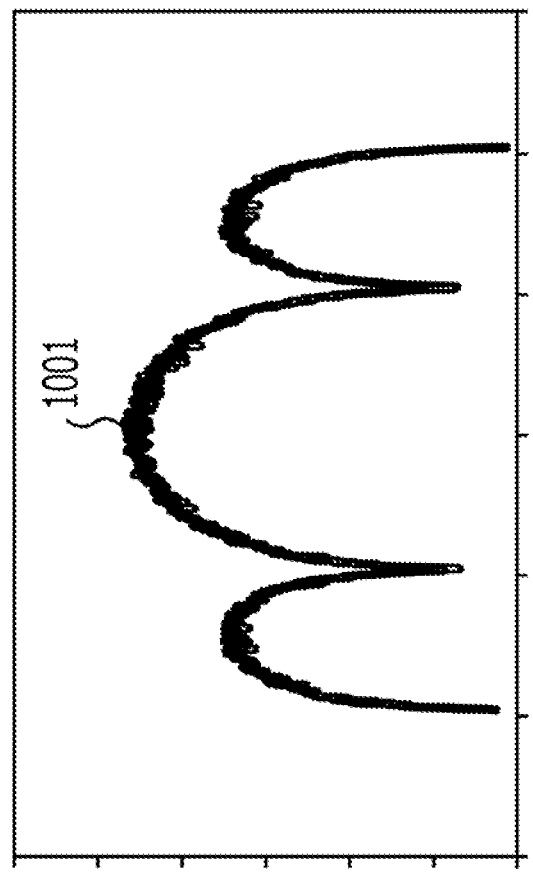
FIG. 10 illustrates an example of a spectrum in a case where an electronic band is larger than a signal band.

FIG. 10 is a diagram illustrating an example of a spectrum in a case where the electronic band is larger than the signal band. In FIG. 10, the transverse axis indicates a frequency, and the longitudinal axis indicates a power. A spectrum 1001 illustrated in FIG. 10 indicates a spectrum that is output from the Fourier transformation unit 151 to the digital coherent receiver 100 if the electronic band of the digital coherent receiver 100 is large enough.

Similar to the spectrum 1001, the spectrum is not distorted if the electronic band is large. Therefore, the spectrum gravity center of the spectrum 1001 is closer to the frequency offset. For example, the frequency offset estimate value indicated by the spectrum gravity center of the spectrum 1001 indicates 050 [Hz/Symbol rate].

Figure 11:
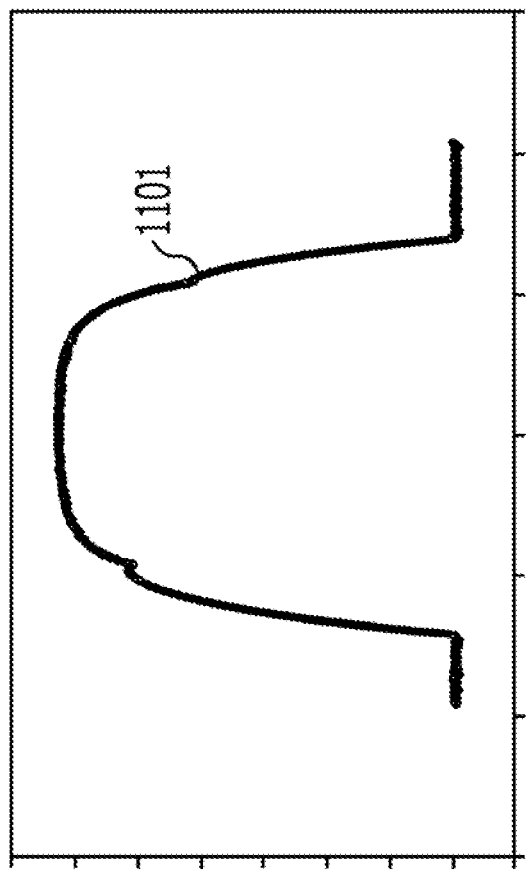
FIG. 11 is illustrates an example of a spectrum in a case where the electronic band is smaller than the signal band.

FIG. 11 is a diagram illustrating an example of a spectrum in a case where the electronic band is narrower than the signal band. In FIG. 11, the transverse axis indicates a frequency, and the longitudinal axis indicates a power. A spectrum 1101 illustrated in FIG. 11 indicates the spectrum that is output from the Fourier transformation unit 151 if the digital coherent receiver 100 has an electronic band of 0.65 [Hz/Symbol rate].

If the electronic band is narrow, the spectrum is narrowed by the electronic band in a way that the spectrum 1101 is narrowed. Therefore, the spectrum gravity center of the spectrum 1101 is shifted from the actual frequency offset. For example, the frequency offset estimate value indicated by the spectrum gravity of the spectrum 1101 indicates 01 [Hz/Symbol rate], which is different from the actual value (see, for example, FIG. 10).

Figure 12:
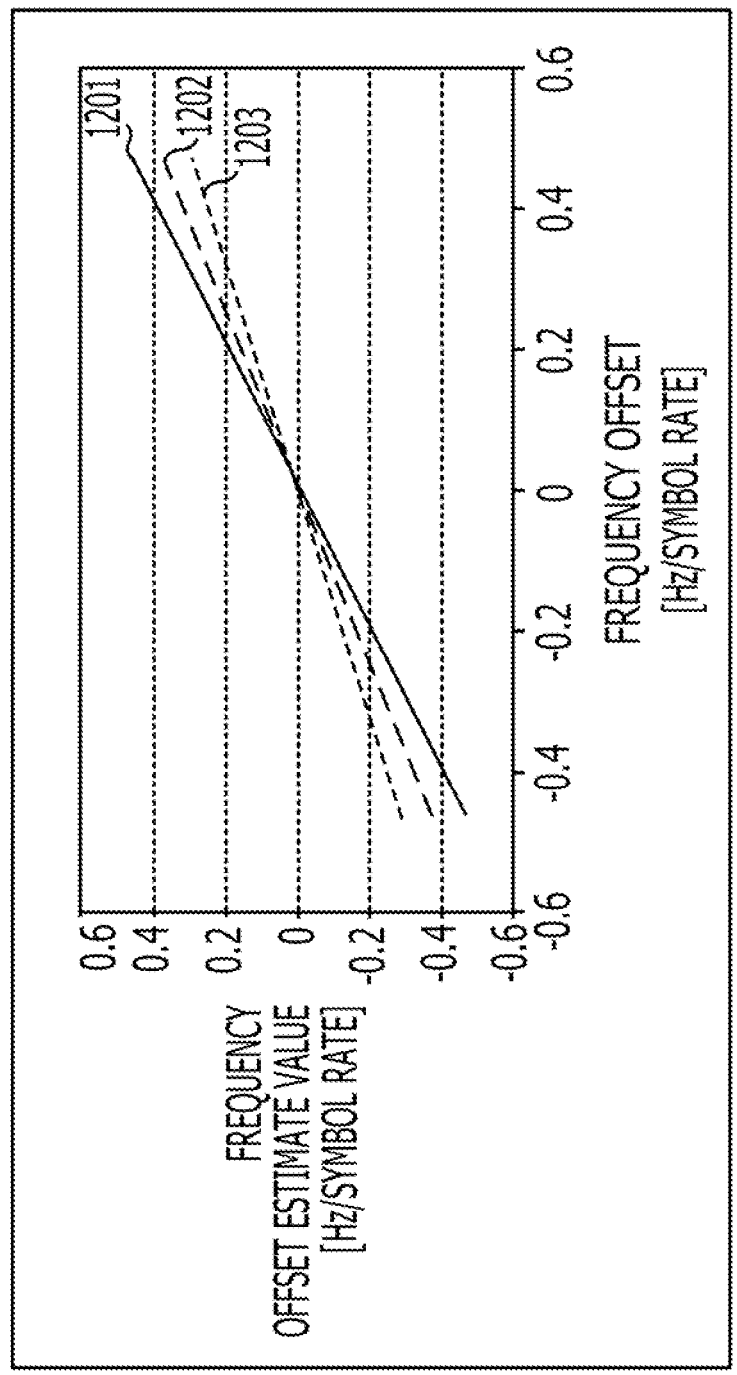
FIG. 12 illustrates a relation between a frequency offset and a frequency offset estimate value.

FIG. 12 is a graph illustrating a relation between a frequency offset and a frequency offset estimate value. In FIG. 12, the transverse axis indicates the actual frequency offset [Hz/Symbol rate]. The longitudinal axis indicates a frequency offset estimate value [Hz/Symbol rate] indicating the spectrum gravity center calculated by the gravity center calculation unit 152.

A relation 1201 indicates a relation between the frequency offset and the frequency offset estimate value if the digital coherent receiver 100 has no band limitation. A relation 1202 indicates a relation between the frequency offset and the frequency offset estimate value if the digital coherent receiver 100 has 0.93 [Hz/Symbol rate] band limitation. A relation 1203 indicates a relation between the frequency offset and the frequency offset estimate value if the digital coherent receiver 100 has 0.65 [Hz/Symbol rate] band limitation.

As illustrated by the relations 1201 to 1203, the relation between the frequency offset and the frequency offset estimate value varies according to the band limitation of the digital coherent receiver 100. On the other hand, the storage unit 902 of the frequency offset estimation unit 153 stores the correction information that differs corresponding to the band limitation. As a result, the frequency offset estimate value indicated by the spectrum gravity center calculated by the gravity center calculation unit 152 is corrected to obtain a frequency offset estimate value with high accuracy.

Figure 13:
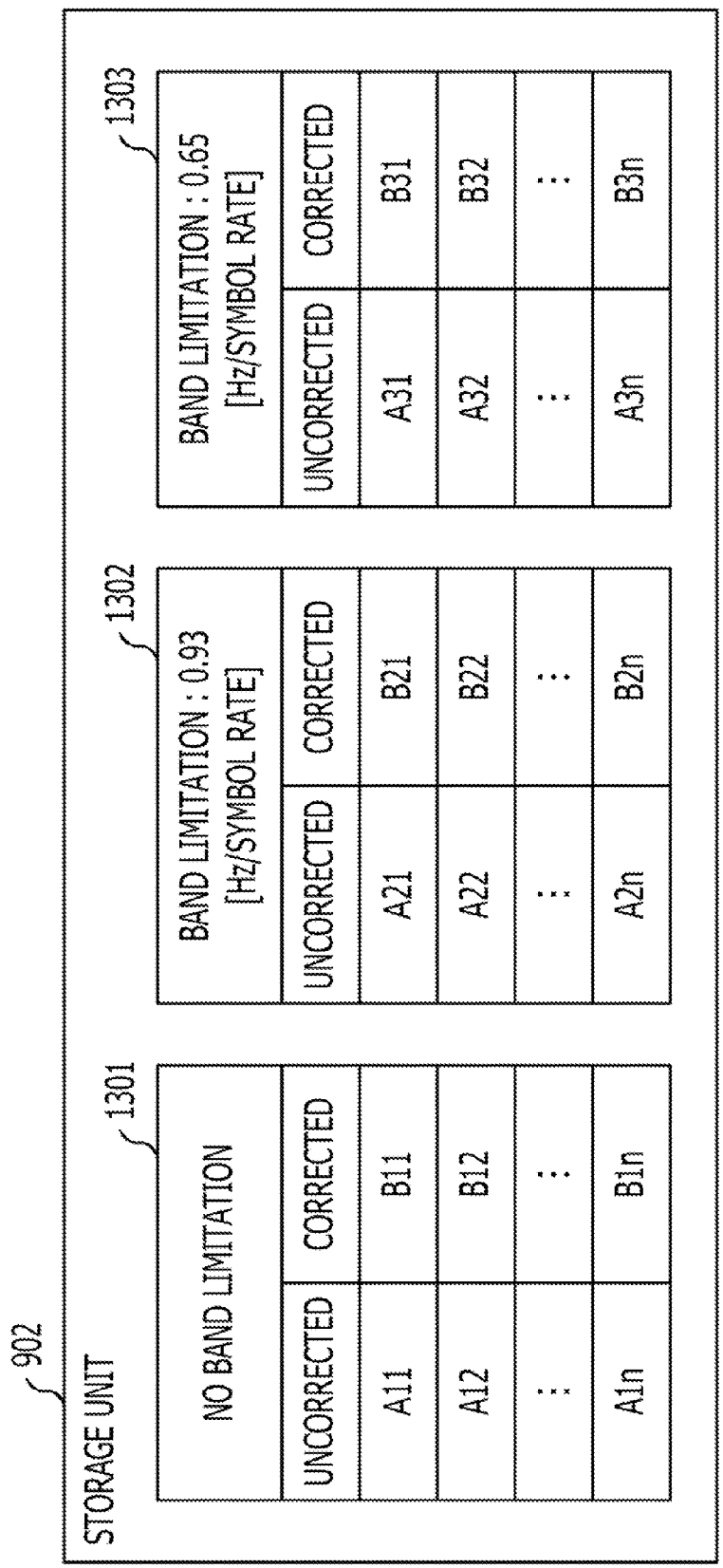
FIG. 13 illustrates an example of correction information to be stored in a storage unit.

FIG. 13 is a diagram illustrating an example of the correction information to be stored in a storage unit. The storage unit 902 stores, for example, correction information 1301 to 1303 illustrated in FIG. 13. The correction information 1301 is correspondence information that makes uncorrected spectrum gravity centers A11 to A1$n$ correspond to uncorrected spectrum gravity centers B11 to B1$n$ if the digital coherent receiver 100 has no band limitation. The correction information 1301 is determined based on, for example, the relation 1201 illustrated in FIG. 12.

The correction information 1302 is correspondence information that makes uncorrected spectrum gravity centers S21 to A2$n$ correspond to corrected spectrum gravity centers B21 to B2$n$ if the digital coherent receiver 100 has 0.93 [Hz/Symbol rate] band limitation. The correction information 1302 is determined based on, for example, the relation 1202 illustrated in FIG. 12.

The correction information 1303 is correspondence information that makes uncorrected spectrum gravity centers A31 to A3$n$ correspond to corrected spectrum gravity centers B31 to B3$n$ if the digital coherent receiver 100 has 0.65 [Hz/Symbol rate] band limitation. The correction information 1303 is determined based on, for example, the relation 1203 illustrated in FIG. 12.

The correction unit 903 reads, from the storage unit 902, the correction information corresponding to the electronic band output from the setting unit 901. Based on the read correction information, the correction unit 903 obtains the corrected spectrum gravity center corresponding to the uncorrected spectrum gravity center output from the gravity center calculation unit 152. The correction unit 903 outputs the obtained spectrum gravity center.

As described above, after correcting the calculated spectrum gravity center according to the electronic band, the digital coherent receiver 100 according to the third embodiment may accurately obtain a frequency offset estimate value even if the spectrum of the signal is distorted according to the electronic band. As a result, the reception quality may be further improved.

For example, if the frequency offset estimation unit 153 illustrated in FIG. 5 is used, the frequency offset may be more accurately estimated by setting the spectrum gravity center corrected according to the electronic band to the initial value. The starting time of the digital coherent receiver 100 may be further shortened if the spectrum gravity center accurately indicating the frequency offset estimate value is set as the initial value. If the frequency offset estimation unit 153 illustrated in FIG. 7 or FIG. 8 is used, the frequency offset calculated based on the input signal may be accurately corrected, and the frequency offset may be more accurately estimated.

Fourth Embodiment

For the digital coherent receiver 100 according to the fourth embodiment, descriptions of the parts similar to the parts of the digital coherent receiver 100 according to the first embodiment are omitted.

Figure 14:
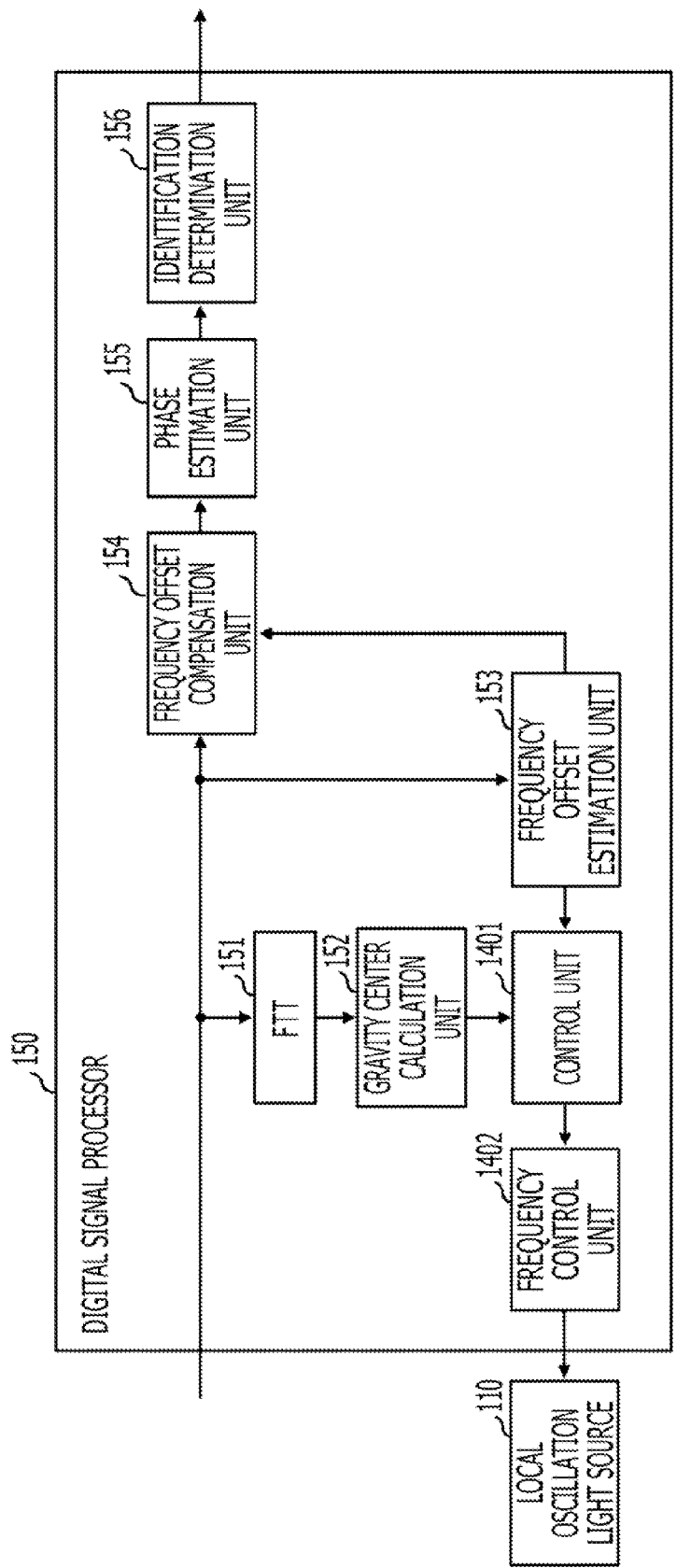
FIG. 14 illustrates a configuration example of a digital signal processor according to a fourth embodiment.

FIG. 14 is a diagram illustrating a configuration example of the digital signal processor according to the fourth embodiment. In FIG. 14, the parts similar to the parts of the configuration illustrated in FIG. 3 are indicated with the same numerals, and the descriptions are omitted. As illustrated in FIG. 14, the digital signal processor 150 according to the fourth embodiment includes a control unit 1401, and a frequency control unit 1402 in addition to the configuration illustrated in FIG. 3.

The gravity center calculation unit 152 outputs the calculated spectrum gravity center to the control unit 1401. The control unit 1401 outputs the spectrum gravity center output from the gravity center calculation unit 152 to the frequency control unit 1402 and the frequency offset estimation unit 153. For example, the gravity center calculation unit 152 outputs the spectrum gravity center to the frequency control unit 1402 during an initial operation of the digital signal processor 150. If the spectrum gravity center output from the gravity center calculation unit 152 is equal to or smaller than a threshold value, the control unit 1401 switches an output destination of the spectrum gravity center to the frequency offset estimation unit 153.

The frequency control unit 1402 controls the frequency of the local oscillator light generated by the local oscillator light source 110 so that the spectrum gravity center output from the control unit 1401 is reduced. According to the control by the frequency control unit 1402, the local oscillator light source 110 varies the frequency of the local oscillator light to be generated. The frequency offset estimation unit 153 estimates the frequency offset based on the spectrum gravity center output from the control unit 1401. The frequency offset estimation unit 153 illustrated in FIG. 5, FIG. 7, or FIG. 8 may be used as the frequency offset estimation unit 153.

According to the above-described configuration, if the control unit 1401 outputs the spectrum gravity center to the frequency control unit 1402, the frequency offset may be compensated in an earlier stage of the digital signal processor 150. If the control unit 1401 outputs the spectrum gravity center to the frequency offset estimation unit 153 when the spectrum gravity center indicates a value equal to or smaller than the threshold value, the frequency offset may be estimated and compensated when the frequency is small.

In the configuration illustrated in FIG. 14, the gravity center calculation unit 152 may output the spectrum gravity center to the frequency control unit 1402. In this case, the control unit 1401 may be omitted. Furthermore, the initial value setting unit 510 of the frequency offset estimation unit 153 illustrated in FIG. 5 may be omitted. Moreover, the loop filter 507, the addition unit 508, the delay unit 509, and the initial value setting unit 510 of the frequency offset estimation unit 153 illustrated in FIGS. 7 and 8 may be omitted. Also in this case, if the frequency of the local oscillator light is controlled by using the spectrum gravity center of the signal, the frequency offset may be estimated and compensated when the frequency offset is small.

If the frequency of the local oscillator light is controlled by using the spectrum gravity center of the signal, the digital coherent receiver 100 according to the fourth embodiment may estimate and compensate the frequency offset when the frequency offset is small. Accordingly, the frequency offset remains within the pull-in range even if the pull-in range of the frequency offset is narrowed, so that the frequency offset may be accurately estimated and compensated.

As a result, the reception quality may be improved. Furthermore, the frequency offset may be accurately estimated without expanding the pull-in range by using the differential decoding, for example. As a result, the reception quality may be improved because the deterioration of the OSNR property is reduced. If the frequency offset is estimated when the frequency offset is small, the estimation results of the frequency offset may be converged in a short time. Therefore, the starting time of the digital coherent receiver 100 may be shortened.

As described above, the digital coherent receiver and the receiving method may improve the reception quality.

According to the embodiments, the digital coherent receiver and the receiving method have an advantage that the reception quality is improved.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the invention have been described in detail, it should be understood that the various changes, substitutions, and alterations could be made hereto without departing from the spirit and scope of the invention.

What is claimed is:

1. A digital coherent receiver comprising:
a front end that converts a light signal into an electric signal by using a signal light and a local oscillator light;
an A/D convertor that converts the electric signal of the front end into a digital signal; and
a processor that calculates a frequency for separating a spectrum of the digital signal converted by the A/D convertor into two halves as a spectrum gravity center, estimates a frequency offset of the digital signal based on the calculated spectrum gravity center, and reduces the frequency offset of the digital signal based on the estimated frequency offset,
wherein the spectrum gravity center is calculated according to the following equation $$\text{spectrum gravity center} = \frac{\sum_{i=-\frac{N}{2}+1}^{\frac{N}{2}} i * P(i)}{\sum_{i=-\frac{N}{2}+1}^{\frac{N}{2}} P(i)} * \Delta * \frac{1}{fb}.$$

2. The digital coherent receiver according to claim 1, wherein the processor recursively estimates the frequency offset and the calculated spectrum gravity center is set as an initial value of frequency offset estimator.

3. The digital coherent receiver according to claim 2, wherein the processor estimates the frequency offset and frequency offset is corrected by the calculated spectrum gravity center.

4. The digital coherent receiver according to claim 1, wherein the processor corrects the calculated spectrum gravity center according to an electronic band and estimates the frequency offset based on the corrected spectrum gravity center.

5. The digital coherent receiver according to claim 1, wherein the processor controls a frequency of the local oscillator light based on the calculated spectrum gravity center.

6. A method of receiving a light by a digital coherent receiver which includes a front end that converts a light signal into an electric signal by using a signal light and a local oscillator light and an A/D convertor that converts the electric signal of the front end into a digital signal, the method comprising:
calculating a frequency for separating a spectrum of the digital signal converted by the A/D convertor into two halves as a spectrum gravity center;
estimating a frequency offset of the digital signal based on the calculated spectrum gravity center; and
reducing the frequency offset of the digital signal based on the estimated frequency offset,
wherein the spectrum gravity center is calculated according to the following equation $$\text{spectrum gravity center} = \frac{\sum_{i=-\frac{N}{2}+1}^{\frac{N}{2}} i * P(i)}{\sum_{i=-\frac{N}{2}+1}^{\frac{N}{2}} P(i)} * \Delta * \frac{1}{fb}.$$

7. The method according to claim 6, wherein the frequency offset is recursively estimated and the calculated spectrum gravity center is set as the initial value of frequency offset estimator.

8. The method according to claim 7, wherein the frequency offset is estimated by correcting the frequency offset and frequency offset is corrected by the calculated spectrum gravity center.

9. The method according to claim 6, further comprising:
   correcting the calculated spectrum gravity center according to an electronic band; and
   estimating the frequency offset based on the corrected spectrum gravity center.

10. The method according to claim 6, further comprising:
    controlling a frequency of the local oscillator light based on the calculated spectrum gravity center.

* * * * *